United States Patent [19]

Kyogaku et al.

[11] Patent Number: 5,567,872
[45] Date of Patent: Oct. 22, 1996

[54] SCANNING ATOMIC FORCE MICROSCOPE

[75] Inventors: Masafumi Kyogaku; Kiyoshi Takimoto, both of Atsugi, Japan

[73] Assignee: Canon Kabushiki Kaisha, Tokyo, Japan

[21] Appl. No.: 399,521

[22] Filed: Mar. 7, 1995

[30] Foreign Application Priority Data

Mar. 8, 1994 [JP] Japan .................... 6-036735

[51] Int. Cl.$^6$ .................................. G01B 5/28
[52] U.S. Cl. ............................... 73/105
[58] Field of Search .............. 73/105; 250/306, 250/307

[56] References Cited

U.S. PATENT DOCUMENTS

| | | | |
|---|---|---|---|
| 5,204,531 | 4/1993 | Elings et al. | 250/306 |
| 5,210,410 | 5/1993 | Barrett | 250/306 |
| 5,323,003 | 6/1994 | Shido et al. | 250/306 |
| 5,357,105 | 10/1994 | Harp et al. | 250/234 |
| 5,414,260 | 5/1995 | Takimoto et al. | |

FOREIGN PATENT DOCUMENTS 258014 9/1994 Japan .................... 250/306

OTHER PUBLICATIONS

Marti et al., "Control Electronics For Atomic Force Microscopy", Rev. Sci. Instrum., vol. 59, No. 6, Jun. 1988, pp. 836–839.

*Primary Examiner*—Thomas P. Noland
*Assistant Examiner*—Daniel S. Larkin
*Attorney, Agent, or Firm*—Fitzpatrick, Cella, Harper & Scinto

[57] ABSTRACT

A scanning atomic force microscope includes a probe arranged near a sample surface to oppose the sample surface, a support device for supporting the prove, a moving mechanism for moving the probe relative to the sample, and a signal detector for detecting a signal corresponding to a structure of the sample surface obtained by the probe. The signal detector includes a laser beam oscillator for oscillating a laser beam, and a laser beam receiving device for receiving the laser beam which is emitted from the laser beam oscillator and is reflected by the support device. The scanning atomic force microscope is further provided with a laser beam output device which has a function of controlling the laser beam oscillator to discontinuously emit the laser beam.

6 Claims, 5 Drawing Sheets

SCANNING ATOMIC FORCE MICROSCOPE

BACKGROUND OF THE INVENTION

1. Field of the Invention

The present invention relates to a spatial displacement detection device for a probe of a scanning atomic force microscope and, more particularly, to a spatial displacement detection device using a laser beam.

2. Related Background Art

As one of surface microscopes having a spatial resolution on the atomic scale, a scanning atomic force microscope (to be abbreviated as an AFM hereinafter) has been put into practical applications. The AFM utilizes an interatomic force acting on a probe and a sample surface, and forms a sample surface image with three-dimensional pattern information by detecting the force acting on the probe and a sample while two-dimensionally scanning the sample surface.

Since the AFM measures the interatomic force between the probe and sample, it can advantageously measure not only the surface of a conductive material such as a metal but also the surface of a non-conductive material including an organic material. The arrangement of a general AFM apparatus will be explained below.

A probe normally has a sharp distal end having a radius of curvature of several hundred nm, and is formed near the free end of a thin film lever with resiliency, which is called a cantilever. An actuator (e.g., a piezoelectric element) is attached to the cantilever or a sample base to allow displacements in three-dimensional directions, so that the probe and the sample base are relatively three-dimensionally movable.

When the probe is brought close to a distance of several Å or less to the sample surface, an interatomic force consisting of an attractive force as a dispersion force, and a repulsive force caused by the Pauli exclusion principle effectively acts between the probe and the sample surface, and in some cases, an electrostatic force or an adsorption force via an adsorption substance acts. The cantilever is bent in proportion to a sum of these local forces. Therefore, by detecting the bend of the cantilever, information associated with a three-dimensional pattern or physical properties on the sample surface can be obtained.

Furthermore, using a material having an electric or magnetic dipole, or a mechanism for detecting an induced electromotive force for the probe, the AFM is applied to examination of the electromagnetic nature on the sample surface or inside the sample.

In the AFM, as a method of detecting displacements of the cantilever in a direction perpendicular to the sample surface (Z-direction), an optical lever method or a laser interference method using a laser beam is popularly used in view of convenience in arranging the apparatus. In these methods, a continuously emitted convergent laser beam is irradiated onto the distal end of the cantilever, and any shift of the reflection angle of the laser beam reflected by the back surface of the cantilever is detected, thereby detecting the displacement, in the Z-direction, of the probe. Based on this displacement, for example, the distribution, in the height direction, of the sample surface is obtained.

The probe is maintained at a position in the vicinity of the sample surface by being pressed by the resiliency of the cantilever or by the attractive force with the sample surface. At this time, the distance between a support portion of the cantilever and an average horizontal plane of the sample surface is maintained constant, and the oscillating displacement of the cantilever is detected as three-dimensional pattern information of the sample surface. Alternatively, an output from a photodiode is used as a feedback control signal for an actuator, which is attached to a sample or a probe and controls a displacement in the Z-direction, so as to maintain the force acting between the probe and the sample surface to be constant, i.e., to maintain the reflection angle of a laser beam reflected by the back surface of the cantilever to be constant, and the feedback control signal is detected as a three-dimensional pattern signal of the sample surface.

In the AFM with the above arrangement, by scanning the probe on an X-Y plane with respect to the sample surface, and displaying the three-dimensional pattern signal of the sample surface in correspondence with the sample surface coordinates, a three-dimensional enlarged image of the sample surface can be obtained.

In the above-mentioned AFM, when a fine displacement detection method of a cantilever using a laser beam such as the laser interference method or the optical lever method is used, the temperature of the cantilever rises due to the energy of the laser beam, and a warp or distortion is generated by thermal expansion/contraction of the temperature-raised cantilever, thus drifting the reflection angle of the reflected laser beam due to the change in temperature independently of the three-dimensional pattern on the sample surface. In particular, when one surface of the cantilever is coated with a material having a composition different from that of the cantilever, since the cantilever has an asymmetrical composition structure, the thermal expansion/contraction difference between the front and rear surfaces of the cantilever becomes conspicuous due to different thermal expansion coefficients of the materials with different compositions, thus promoting the warp or distortion of the cantilever.

Although a focal point is formed on the distal end of the cantilever by a focusing lens so as to irradiate a laser beam onto only the distal end portion of the cantilever, some light components of the laser beam are undesirably irradiated onto the probe and the sample surface due to diffusion of the laser beam caused by the shape and size of the cantilever, diffraction of the laser beam by the cantilever, or the like. For this reason, the temperatures of the probe and the sample surface rise, and the physical properties of the sample surface may change. Depending on the types of samples, a temporary or permanent change in physical properties is caused by optical pumping, and the change in physical properties may lead to a change in form of the sample. When the change in form occurs, a three-dimensional pattern image of the sample surface, which is different from that obtained before laser irradiation, is undesirably formed.

Furthermore, in atmospheric air, an adsorption force may act between the probe and the sample surface via an adsorbent substance such as water molecules present on the sample and probe surfaces, and may account for principal components of the attractive force acting between the probe and the sample surface. However, when the temperature of the sample or probe rises upon irradiation of the laser beam, adsorbed molecules dissociate, and the adsorption force decreases. The measurement using the AFM is controlled to detect the force acting on the probe as three-dimensional pattern information on the sample surface or to maintain the force acting on the probe to be constant. For this reason, when the adsorption force between the probe and sample changes, the force acting on the probe changes as time elapses, and the resolution undesirably changes.

In addition, in a gas including atmospheric air, heat dissipation is attained by transmission of energy to gas molecules by collision of the gas molecules, in addition to a heat dissipation process due to heat conduction or heat radiation of the cantilever. However, when the measurement using the AFM is performed in a vacuum, since the density of gas molecules is very small, the heat dissipation performance of the cantilever is lowered, resulting in temperature rise. Therefore, the above-mentioned warp or distortion of the cantilever due to its thermal expansion/contraction is generated.

SUMMARY OF THE INVENTION

The present invention has been made in consideration of the above situation, and has as its object to provide an AFM which can suppress a change in temperature of a cantilever, probe, and sample surface caused by irradiation of a laser beam, and has high stability.

According to the present invention, there is provided a scanning atomic force microscope, which comprises: a probe which is arranged in the vicinity of a sample surface to oppose the sample surface; support means for supporting the probe; moving means for moving the probe relative to the sample; and signal detection means for detecting a signal corresponding to a structure of the sample surface obtained by the probe, and in which the signal detection means comprises a laser beam oscillation element for oscillating a laser beam, and a laser beam receiving unit for receiving the laser beam which is emitted from the laser beam oscillation element and is reflected by the support means, comprising:

laser beam output means having a function of controlling the laser beam oscillation element to discontinuously emit the laser beam.

DETAILED DESCRIPTION OF THE PREFERRED EMBODIMENTS

Figure 1:
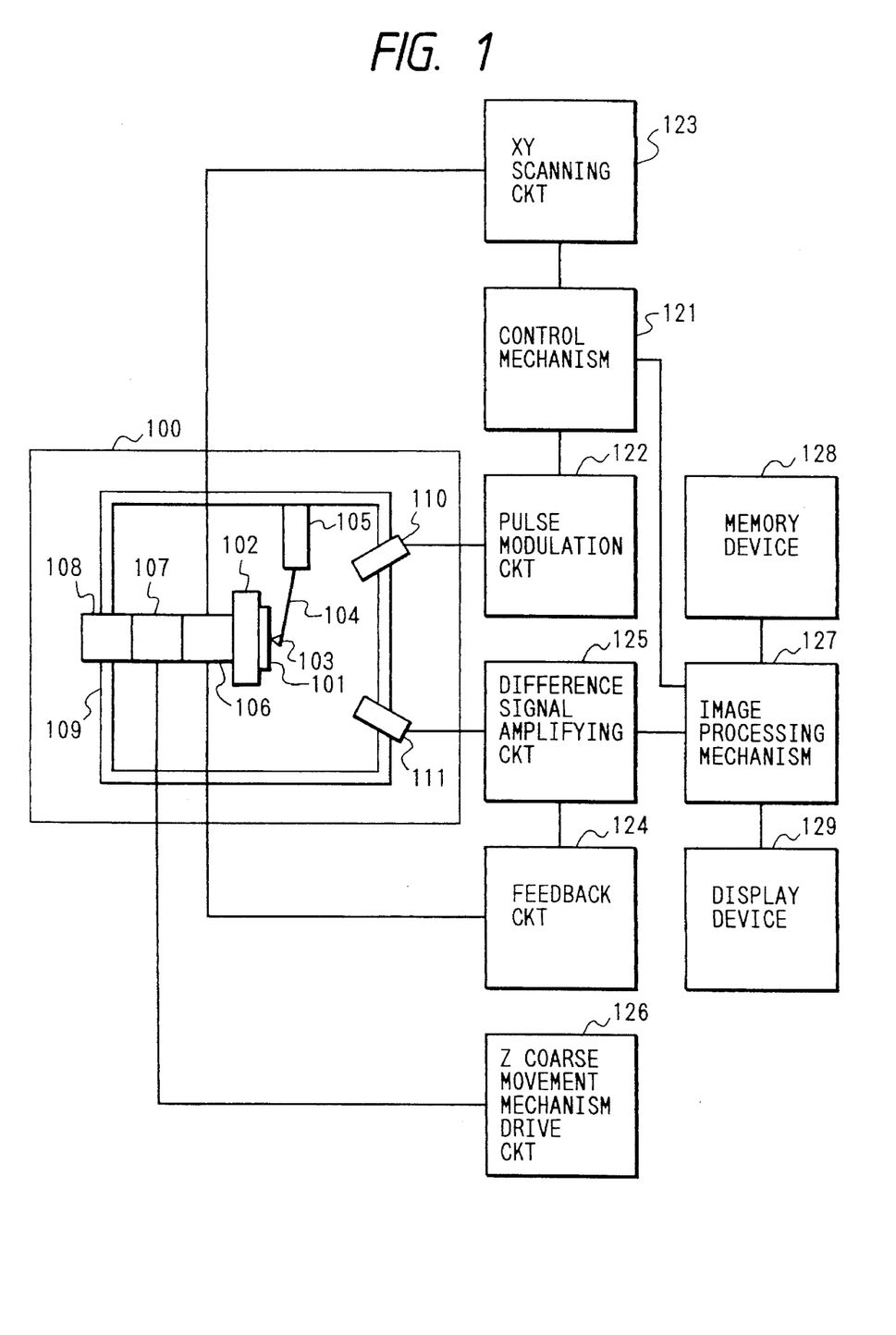
FIG. 1 is a schematic diagram of an AFM according to the first embodiment of the present invention.
Figure 2:
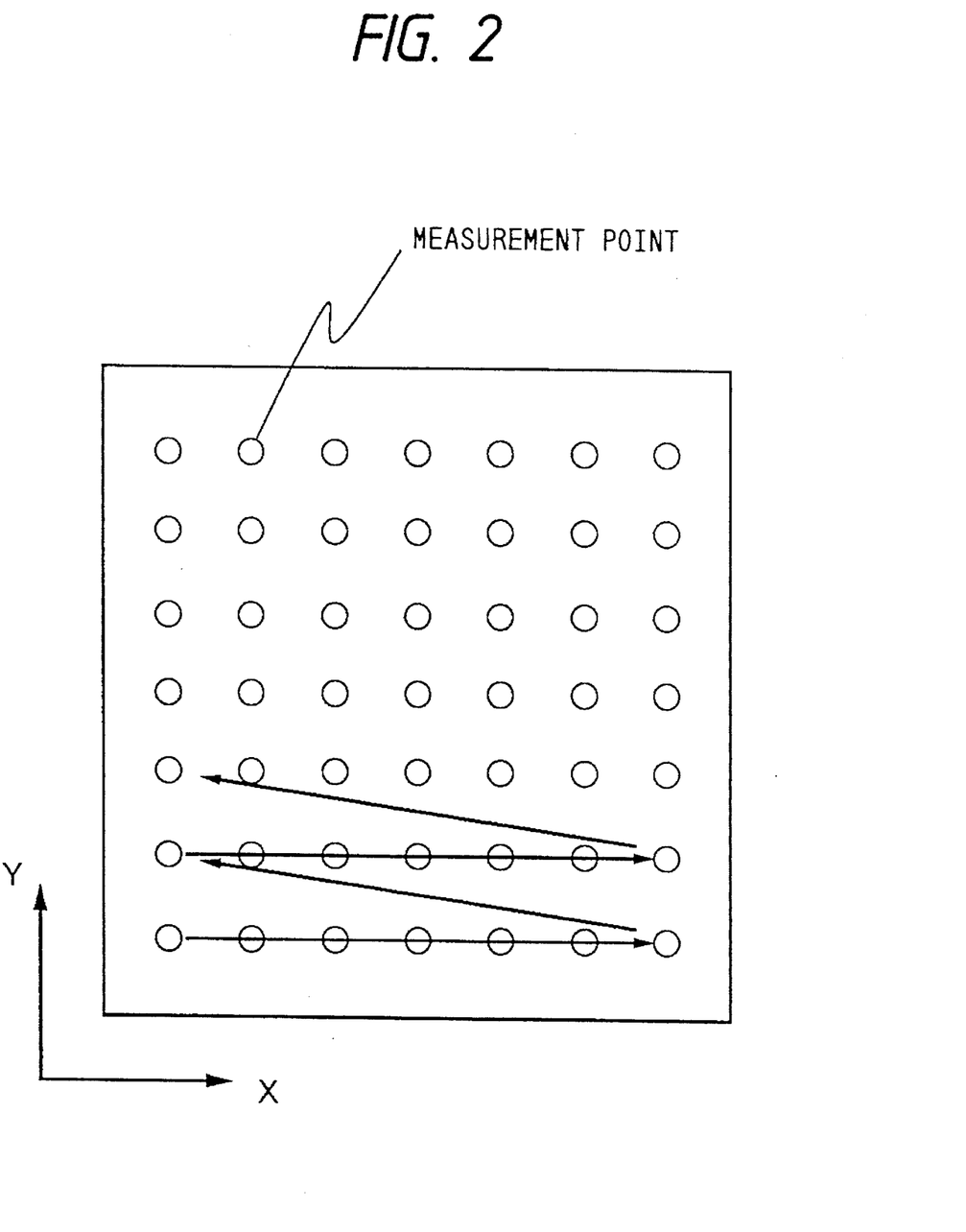
FIG. 2 is a view showing an example of the relationship between the measurement points and the scanning order in the arrangement shown in FIG. 1.

The first embodiment of the present invention will be described below with reference to FIGS. 1 and 2. FIG. 1 is a schematic diagram of an AFM according to the first embodiment of the present invention. FIG. 2 is a view showing an example of the relationship between the measurement points on the scanning region and the scanning order in the arrangement shown in FIG. 1.

The arrangement of an AFM unit 100 will be explained first below. A sample 101 is fixed on a sample base 102. The bottom portion of the sample base 102 is attached to an XYZ fine movement mechanism 106. A probe 103 is held near one, free end of a cantilever 104. The cantilever 104 is fixed to an AFM unit base 109 via a frame 105 at its end portion which does not hold the probe, and the surface of the cantilever 104 has mirror surface precision with a sufficient reflectance of a laser beam in measurement. The probe 103 and the cantilever 104 may be integrally formed. The XYZ fine movement mechanism 106 comprises a cylindrical piezoelectric actuator, and is fixed to a Z coarse movement mechanism 107. The Z coarse movement mechanism 107 is connected to an XY alignment mechanism 108. The XY alignment mechanism 108 is fixed to the AFM unit base 109. A laser beam emitting element 110 is attached to the AFM unit base 109, and emits a laser beam. The direction of the laser beam emitted from the element is adjusted, so that the laser beam is irradiated on a portion near the free end of the cantilever 104. A laser beam receiving unit 111 comprises a two-split sensor consisting of photodiodes, and is attached to the AFM unit base 109. The laser beam receiving unit 111 receives the laser beam reflected by the cantilever 104.

A control mechanism 121 instructs to a pulse modulation circuit 122 so as to effect an output for driving the laser beam emitting element 110 and also instructs to an XY scanning circuit 123 so as to output an XY scanning signal for driving the XYZ fine movement mechanism 106. Further the control mechanism 121 supplies surface coordinate information of the sample 101 to an image processing mechanism 127. The pulse modulation circuit 122 outputs a predetermined voltage to cause the laser beam emitting element 110 to emit a laser beam. The XY scanning circuit 123 outputs an XY scanning signal to drive the XYZ fine movement mechanism 106. A difference signal amplifying circuit 125 amplifies a difference signal of the outputs from the two-split sensor portions as detection results of the laser beam receiving unit 111, and outputs the amplified signal as a feedback signal to a feedback circuit 124, and the image processing mechanism 127. The feedback circuit 124 drives the XYZ fine movement mechanism 106. A Z coarse movement mechanism drive circuit 126 drives the Z coarse movement mechanism 107. The image processing mechanism 127 outputs a pixel signal to a memory device 128, and outputs a three-dimensional pattern image of the surface of the sample 101 to a display device 129 after image processing.

The operation of this embodiment will be described below. In the cylindrical piezoelectric actuator constituting the XYZ fine movement mechanism 106, divided electrodes are arranged on the outer circumferential surface of a cylindrical piezoelectric element, and by controlling voltages to be applied to these divided electrodes, the cylinder is deformed. The deformation of the cylinder finely displaces the sample 101 and the sample base 102 three-dimensionally. Therefore, the XYZ fine movement mechanism 106 has a function of an XY-axis drive mechanism for moving the sample base 102 in the X- and Y-directions substantially parallel to the plane of the sample 101, and a function of a Z-axis drive mechanism for maintaining the probe 103 to be separated from the sample surface by a given distance. The Z coarse movement mechanism 107 brings the sample 101 closer to the cantilever 104 until the cantilever 104 receives a predetermined force. The arrangement of the Z coarse movement mechanism 107 can be realized by manually driving a micrometer, by electrically driving a piezoelectric element or the like attached thereto, by a method as a combination of the micrometer and the piezoelectric element, or the like. The XY alignment mechanism 108 roughly determines the position of the probe 103 with respect to the measurement region on the surface of the sample 101, has a movement mechanism for moving the Z coarse movement mechanism 107 in the X- or Y-direction, and aligns the probe 103 by a visual observation of an operator or an observation via an optical microscope. The laser beam receiving unit 111 detects any shift of the reflection angle of the reflected laser beam on the basis of the difference between light amounts detected by two light-receiving portions of the two-split sensor. The laser beam receiving unit 111 is movable on the AFM unit base 109, and its light-receiving position can be adjusted to optimally receive the laser beam. The laser beam emitted from the laser beam emitting element 110 is irradiated onto the cantilever 104, and the laser beam reflected by the cantilever 104 is received by the laser beam receiving unit 111, thereby detecting the displacement of the cantilever 104.

The control mechanism 121 assigns pixels on a scanning surface of a predetermined measurement region on the surface of the sample 101 to surface coordinate positions, and controls the pulse modulation circuit 122 to output a pulse-shaped voltage signal in synchronism with the time at which the probe 103 is located at each surface coordinate position. The pulse modulation circuit 122 causes the laser beam emitting element 110 to emit a pulsed laser beam under the control of the control mechanism 121. The laser beam emitted from the laser beam emitting element 110 under the control of the pulse modulation circuit 122 may be a one-shot pulse or a plurality of successive pulses. When a laser beam to be emitted at a certain measurement point consists of a plurality of pulses, a detection signal at that measurement point is obtained by calculating the average value of signals detected as the plurality of pulses. As for the relationship between emission of the laser beam and scanning, the scanning may be continued without stopping the probe 103 while the laser beam is being emitted, or the probe 103 may be temporarily stopped while the laser beam is being emitted.

The control mechanism 121 assigns pixels on the scanning surface of the predetermined measurement region on the surface of the sample 101 to surface coordinate positions, and controls the XY scanning circuit 123 to output an XY scanning signal so as to scan the respective surface coordinate positions in turn. The XY scanning circuit 123 operates the XYZ fine movement mechanism 106 based on the XY scanning signal output therefrom under the control of the control mechanism 121, thereby two-dimensionally moving the sample base 102 attached to the XYZ fine movement mechanism 106, and the sample 101 attached to the sample base 102. Therefore, the fixed probe 103 relatively scans on the sample surface. As a scanning route of the XY scanning signal output from the control mechanism 121, as shown in FIG. 2, when a scanning operation on a certain X scanning line is completed the scanning point moves in the Y-direction to scan the next X scanning line, and this operation is repeated. Note that the scanning route is not limited to this as long as it can cover all the pixels finally.

The laser beam emitted from the laser beam emitting element 110 is reflected by a surface, opposite to the surface which holds the probe 103, of the cantilever 104, and the reflected laser beam is received by the laser beam receiving unit 111. The reflected laser beam received by the two-split sensor of the laser beam receiving unit 111 is detected as a difference signal representing the shift of the reflection angle which is proportional to the deflection of the cantilever 104. More specifically, the reflection angle of the reflected laser beam changes in correspondence with the three-dimensional pattern such as a recess and projection on the surface of the sample 101. The detected difference signal is supplied to the difference signal amplifying circuit 125, and is then output to the feedback circuit 124 and the image processing mechanism 127 as a feedback signal.

The feedback circuit 124 performs sample position control in the Z-direction on the basis of the feedback signal output from the difference signal amplifying circuit 125 by driving the XYZ fine movement mechanism 106, so that the cantilever 104 does not flex and the probe 103 receives a constant force, i.e., the reflection angle of the reflected laser beam received by the laser beam receiving unit 111 becomes constant. With this control, a constant distance is maintained between the probe 103 and the surface of the sample 101.

The image processing mechanism 127 forms pixel signals using a correspondence between surface coordinate information of the sample 101 supplied from the control mechanism 121 and the feedback signal output from the difference signal amplifying circuit 125 (the feedback signal is used as height information with respect to each surface coordinate position on the sample 101), and outputs the pixel signals to the memory device 128. The image processing mechanism 127 performs image processing, and outputs a three-dimensional pattern image of the surface of the sample 101 to the display device 129. The display device 129 displays the three-dimensional pattern image of the surface of the sample 101 as a bird's-eye view or a luminance modulation chart.

Figure 3A:
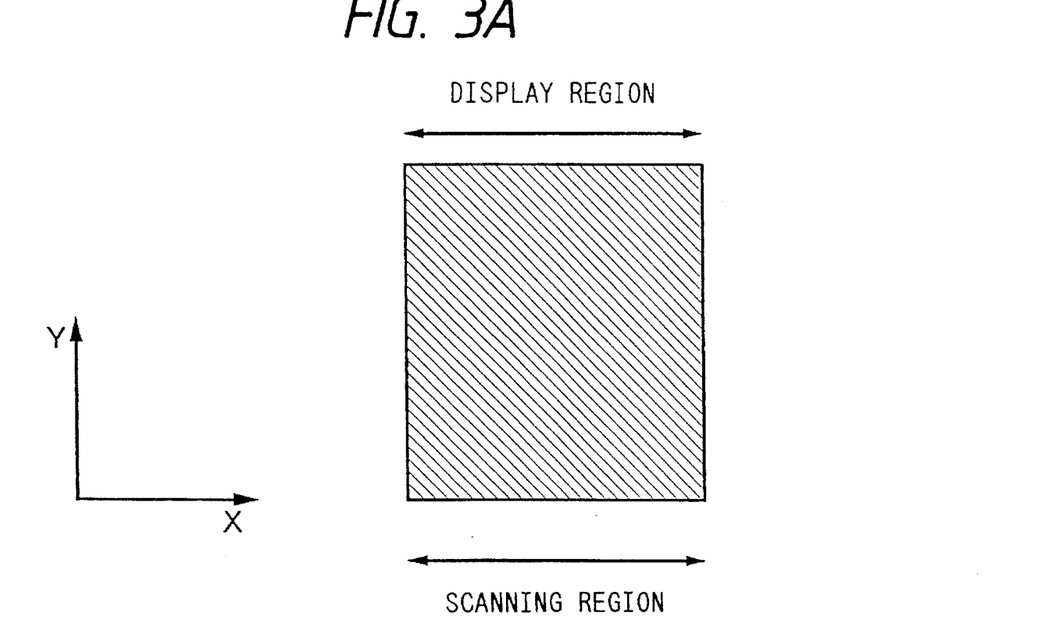
FIGS. 3A and 3B are views showing the relationship between the image display region and the scanning region upon scanning of a probe according to the second embodiment of the present invention.
Figure 3B:
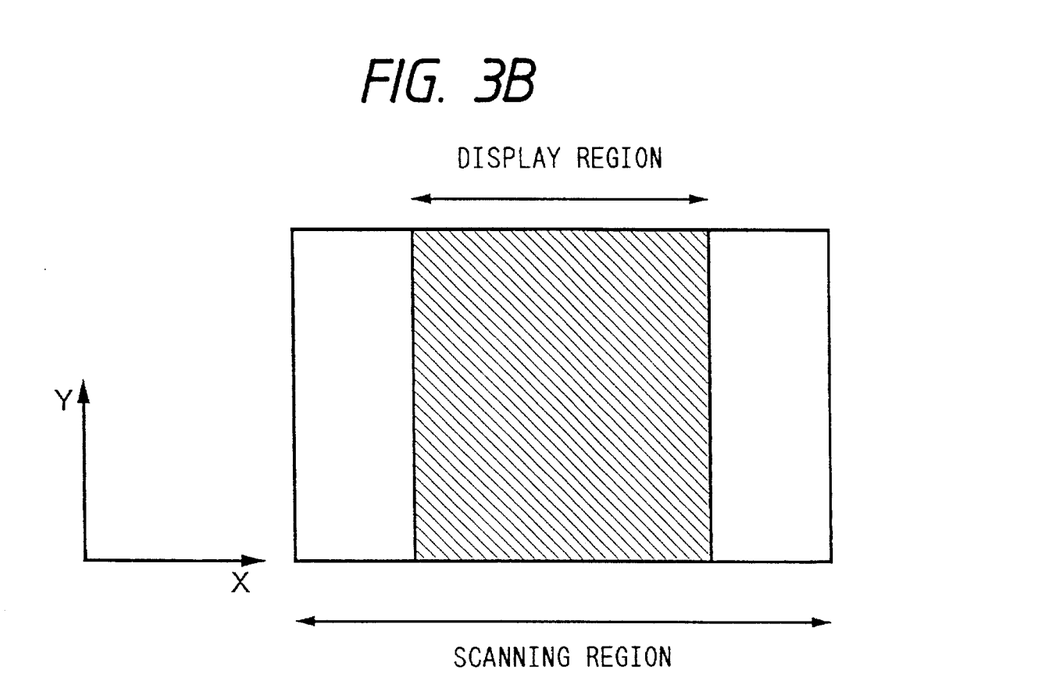

The second embodiment of the present invention will be described below with reference to FIGS. 3A and 3B. FIGS. 3A and 3B are views showing the relationship between the image display region and the scanning region upon scanning of a probe according to the second embodiment of the present invention. The arrangement of an apparatus of this embodiment is the same as that shown in FIG. 1 used in the first embodiment.

As shown in FIG. 3A, in the first embodiment, the scanning range coincides with the region on the sample surface to be measured. However, as shown in FIG. 3B, in the second embodiment, a region wider, in the X-direction, than the region to be measured is scanned. In the second embodiment, the laser beam is emitted during a period in which the probe 103 scans an image display region, and the laser beam is not emitted during a period in which the probe 103 scans other regions. In this manner, the laser beam is emitted discontinuously. Therefore, upon comparison between the time required for scanning the entire scanning region in the second embodiment with that in the first embodiment, the time required in the second embodiment is slightly prolonged by a scanning time for an image non-display range if the scanning speed of the probe remains the same.

Figure 4:
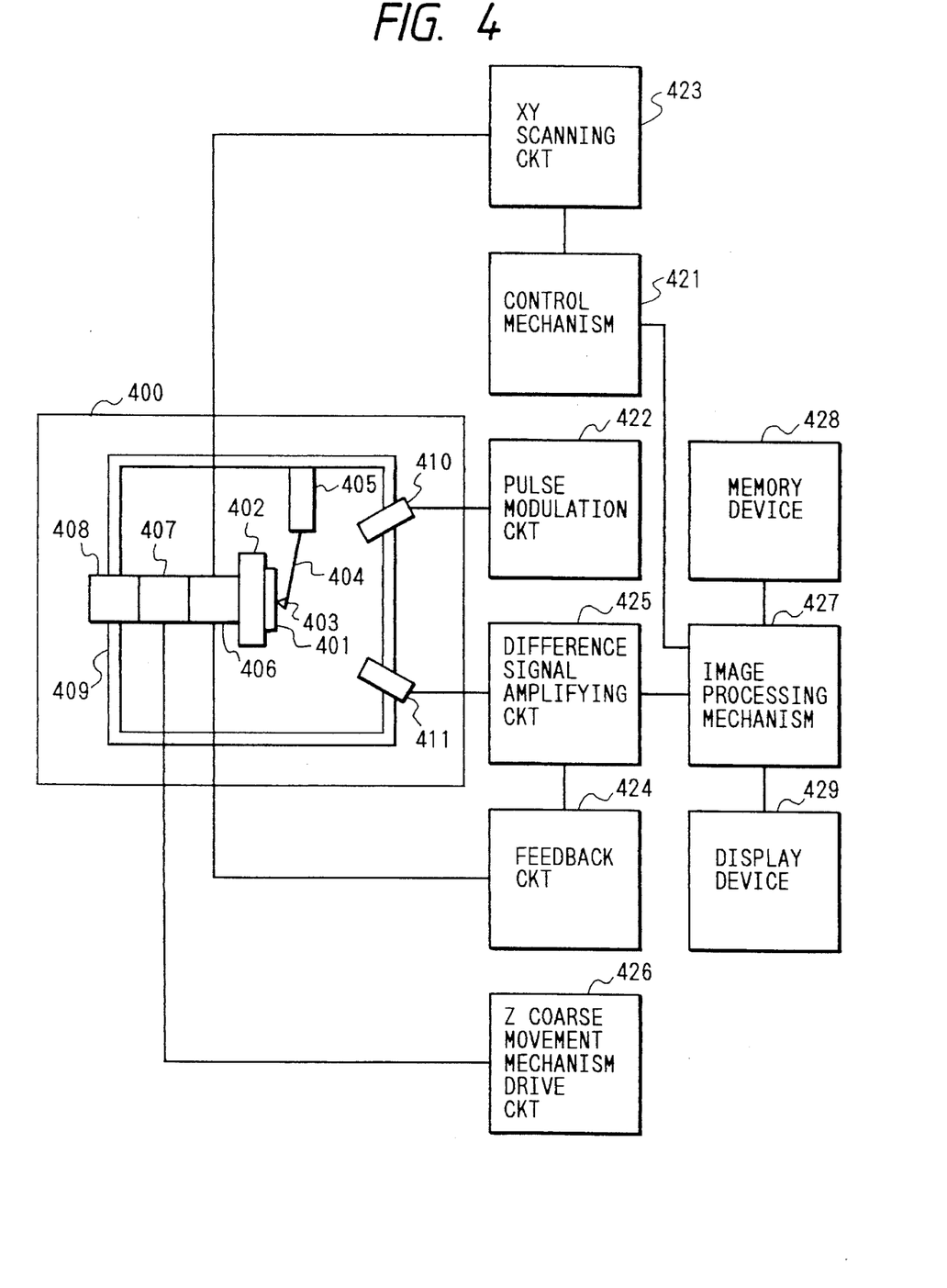
FIG. 4 is a schematic diagram of an AFM according to the third embodiment of the present invention.

The third embodiment of the present invention will be described below with reference to FIG. 4. FIG. 4 is a schematic diagram of an AFM according to the third embodiment of the present invention. The arrangement of an AFM unit 400 is the same as that of the AFM unit 100 in the first embodiment, and components having the same or similar functions as or to those of the first embodiment are expressed by the same names and the same last numerals. A description of the arrangement of the apparatus, and the same operation as in the first embodiment will be omitted.

In the third embodiment, a pulse modulation circuit 422 performs pulse modulation independently of a command from a control mechanism 421. More specifically, the pulse modulation circuit 422 is not synchronized with an XY scanning signal output from an XY scanning circuit 423 under the control of the control mechanism 421, and continuously outputs pulse voltages having independently set periods and amplitudes, thus causing a laser beam emitting element 410 to continuously emit laser pulses. In the third embodiment, the pulse modulation circuit 422 electrically outputs a pulse signal so as to emit laser pulses. Alternatively, a laser beam may be mechanically shielded to obtain laser pulses. As an example of the mechanical method, the optical path of the laser beam may be shielded by a rotary blade having a plurality of blades arranged at an arbitrary interval at an arbitrary time interval before the laser beam reaches a cantilever 404. Furthermore, the pulse width and pulse interval are not limited to regular ones, but may be irregular.

A laser beam receiving unit 411 alternately detects signal portions of the reflected laser pulses, and non-signal portions present between the reflected laser pulses. An image processing mechanism 427 receives an XY scanning signal output from the control mechanism 421, and causes the two-dimensional coordinate position of a probe 403 on the surface of a sample 401 to correspond to a three-dimensional pattern signal of the sample surface output from a difference signal amplifying circuit 425 on the surface coordinate system or the time base. Each non-signal portion is estimated by an interpolation calculation using a plurality of signal values before and after the non-signal portion. On the other hand, a non-signal portion of a signal output from the difference signal amplifying circuit 425 to a feedback circuit 424 as a Z-axis drive signal is replaced by the signal value of an immediately preceding signal portion.

Figure 5A:
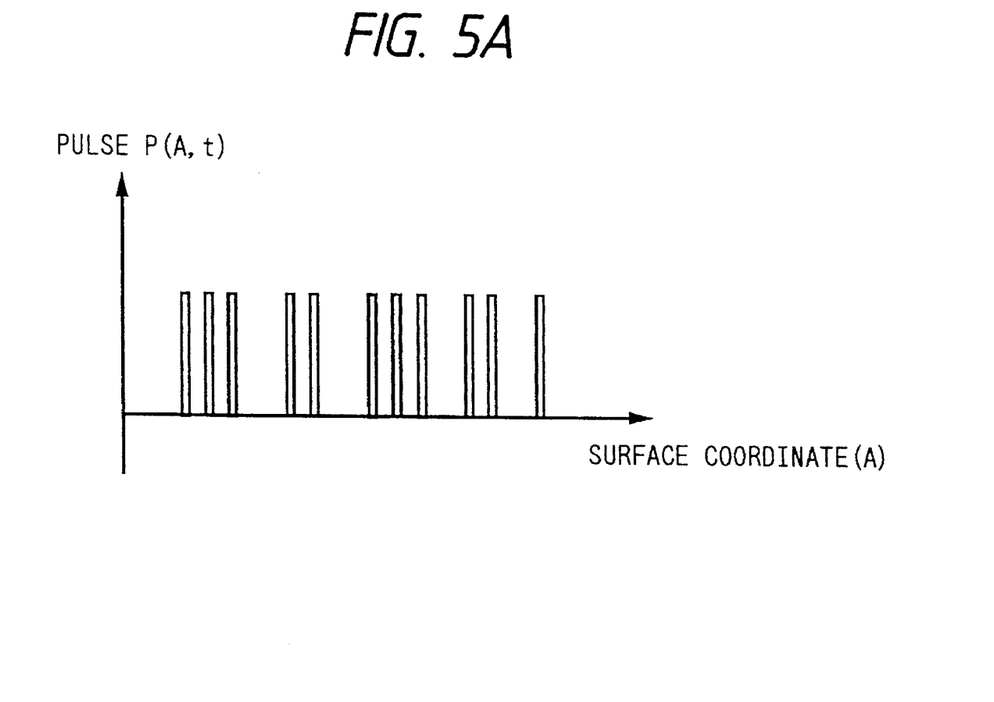
FIGS. 5A and 5B are graphs showing the correspondence between the laser pulses and three-dimensional pattern signal of a sample surface on a surface coordinate system in the arrangement shown in FIG. 4.
Figure 5B:
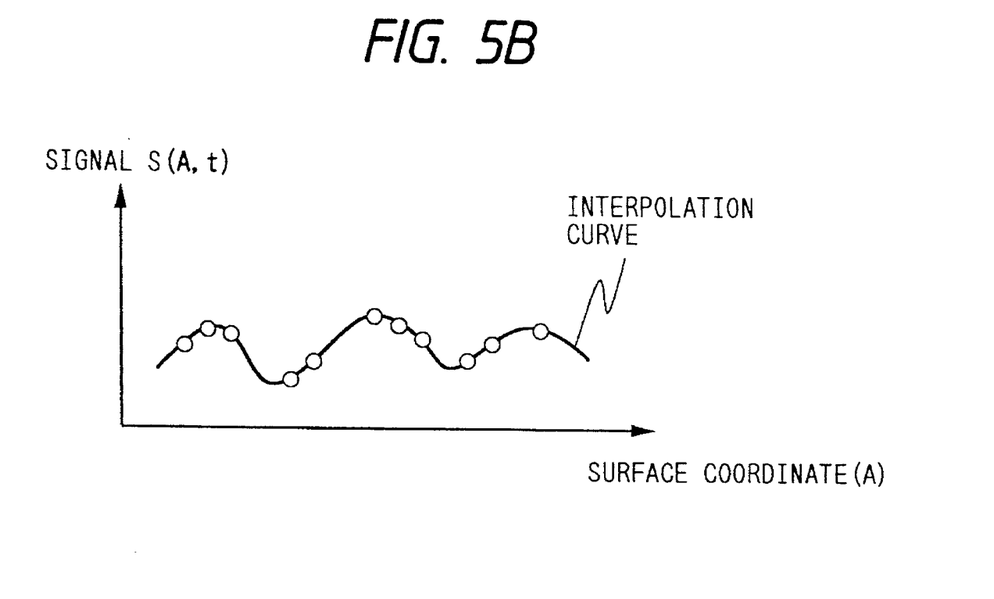

FIGS. 5A and 5B are graphs showing the correspondence between the laser pulses and the three-dimensional pattern signal of the sample surface on the surface coordinate system in the arrangement shown in FIG. 4. In the third embodiment, an RGB monitor is used as a display device 429 to display the surface image of the sample 401. In this case, if a short emission period of the laser beam is set, so that the density of the three-dimensional pattern signal to be displayed of the surface of the sample 401 is higher than the pixel density determined by the scanning line density of the display device 429, the coarseness of an image can be rendered negligible.

As described above, since the AFM according to the present invention comprises laser beam emission means having a function of causing a laser beam oscillation element to discontinuously emit a laser beam, the irradiation amount per unit time of the laser beam onto the cantilever, probe, and sample surface can be reduced as compared to a case wherein the laser beam is continuously irradiated. For this reason, an AFM which can suppress a change in temperature and has high stability can be provided.

Even when a scanning region is set to be wider than predetermined measurement points on the sample surface or a measurement region near the measurement points, the laser beam emission means controls the laser beam oscillation element to emit a one-shot laser pulse or a plurality of continuous laser pulses in synchronism with a timing at which the probe is located on each measurement point or the measurement region near the measurement point on the scanning region, and controls the laser beam oscillation element to stop emission of the laser beam when the probe is located at a region other than the measurement point or the measurement region near the measurement point on the scanning region. With this control, the irradiation amount per unit time of the laser beam onto the cantilever, probe, and sample surface can be reduced as in the above-mentioned case as compared to a case wherein the laser beam is continuously irradiated. For this reason, an AFM which can suppress a change in temperature and has high stability can be provided.

Furthermore, image processing means forms and outputs a sample surface image using a correspondence between an intermittently detected shift signal of the reflection angle of the reflected laser beam, which corresponds to a three-dimensional structure of the sample surface, and the coordinate position of the sample surface where the probe is located at the time of detection of the reflected laser beam. Thus, as compared to a case wherein the laser beam is continuously emitted, the precision of a displayed image can be maintained high without prolonging the required scanning time, and the emission period of the laser beam can be either regular or irregular.

When the image processing means has a function of interpolating a non-signal portion present between each two adjacent signal portions of the intermittently detected shift signal on the basis of shift signal portions detected before and after the non-signal portion, the precision of a displayed image can be maintained high without prolonging the required scanning time as compared to a case wherein the laser beam is continuously emitted, and the emission period of the laser beam can be either regular or irregular.

The AFM apparatus of the present invention can be realized without extensively modifying an existing AFM apparatus since it can be realized by only modifying the control mechanism and the image processing mechanism of the conventional AFM apparatus, and by adding the laser beam emission means.

As can be seen from the above description, the AFM of the present invention has an effect of suppressing a warp or distortion caused by thermal expansion/contraction of a cantilever, and obtaining a reflection angle of the reflected laser beam, which is free from the influence of a temperature drift. Also, the AFM of the present invention has an effect of suppressing a change in form of a sample due to a change in physical properties of the sample surface, and obtaining three-dimensional pattern data of the sample surface with high precision. Furthermore, the AFM of the present invention has an effect of suppressing a change in force acting on the probe due to a decrease in adsorption force between the probe and the sample surface, and obtaining a stable resolution.

What is claimed is:

1. A scanning atomic force microscope, which comprises: a probe which is arranged in the vicinity of a sample surface to oppose the sample surface; support means for supporting said probe; moving means for moving said probe relative to the sample; and signal detection means for detecting a signal corresponding to a structure of the sample surface obtained by said probe, and in which said signal detection means comprises a laser beam oscillation element for oscillating a laser beam, and a laser beam receiving unit for receiving the laser beam which is emitted from said laser beam oscillation element and is reflected by said support means, comprising:

laser beam output means having a function of controlling said laser beam oscillation element to discontinuously emit the laser beam, wherein said laser beam output means controls said laser beam oscillation element to emit the laser beam in synchronism with a timing at which said probe is located on a predetermined measurement point on the sample surface or a measurement region.

2. A microscope according to claim 1, wherein a scanning region is set to be wider than a predetermined measurement point on the sample surface or a measurement region, and said laser beam output means controls said laser beam oscillation element to emit the laser beam in synchronism a timing at which said probe is located on a predetermined measurement point on the sample surface or a measurement region on the scanning region, and controls said laser beam oscillation element to stop emission of the laser beam when said probe is located on a region other than the measurement point or the measurement region on the scanning region.

3. A microscope according to claim 2, wherein the laser beam emitted in synchronism with the timing at which said probe is located at the measurement point or the measurement region consists of a plurality of continuous pulses.

4. A microscope according to claim 1, wherein the laser beam emitted in synchronism with the timing at which said probe is located at the measurement point or the measurement region consists of a plurality of continuous pulses.

5. A microscope according to claim 1, further comprising:

image processing means for outputting an image of the sample surface by causing a relative position between said probe and the sample surface to correspond to the detected signal.

6. A microscope according to claim 5, wherein the detected signal is an intermittent signal, and said image processing means performs an interpolation of a non-signal portion present in the detected signal on the basis of the detected signal detected before and after the non-signal portion.

* * * * *